US006595647B1

(12) United States Patent
Tseng

(10) Patent No.: US 6,595,647 B1
(45) Date of Patent: Jul. 22, 2003

(54) MICRO-DISPLAY ELEMENT

(75) Inventor: Ling-Yuan Tseng, Hsinchu (TW)

(73) Assignee: Taiwan Micro Display Corporation, Hsinchu (TW)

( * ) Notice: Subject to any disclaimer, the term of this patent is extended or adjusted under 35 U.S.C. 154(b) by 87 days.

(21) Appl. No.: 09/635,836

(22) Filed: Aug. 11, 2000

(51) Int. Cl.[7] .................................... G03B 21/14
(52) U.S. Cl. ..................... 353/122; 345/56; 353/99
(58) Field of Search ..................... 353/31, 69, 122; 349/54, 77, 78; 348/771, 745, 747; 345/56

(56) References Cited

U.S. PATENT DOCUMENTS 5,092,671 A * 3/1992 Van Os .................. 353/31
5,653,522 A * 8/1997 Loucks .................. 353/122
5,971,546 A * 10/1999 Park .................. 353/38

* cited by examiner

*Primary Examiner*—William Dowling
(74) *Attorney, Agent, or Firm*—Rosenberg, Klein & Lee

(57) ABSTRACT

A micro-display element used in displaying original images and reflection control module for optical projection display includes a control chip, a driving circuit, a plurality of metallic mirror surface reflection gate elements. The gate element, the driving circuit and the control chip are mounted in sequence from the top to the bottom layer, and the driving circuit is controlled by displaying control signals of the control chip so as to drive the reflection gate elements to cause, the "ON" and "OFF" control and at the outer surrounding of the reflection gate element, along the horizontal axial (X-axis) and the vertical axis (Y-axis) direction, equivalent number of adjustment pixels are provided, such that the micro-displays of R, G, B projected light, during optical module calibration, can be accurately adjusted to superimposed state by means of adjustment pixels which provide sufficient biased calibration in a horizontal axial direction in a vertical axial direction.

4 Claims, 4 Drawing Sheets

MICRO-DISPLAY ELEMENT

BACKGROUND OF THE INVENTION (a) Technical Field of the Invention

The present invention relates to a micro-display device, and in particular to a micro-display device used in an electronic projection display and having a pixel structure with adjustable displacement in the horizontal direction and vertical direction.

(b) Description of the Prior Art

Micro-displays are used in electrical projection display, for instance front projectors, computer displays, and projection TVs. The main function of the micro-display is to produce images by the optical projection, and by means of the mirror surface of the pixels, reflection may be turned "ON" or "OFF". The control method of reflection is divided into the direct reflective method and the penetration method. For instance, in the DMD directive reflective-type structure mode, the light is directly reflected, or in the LCOS structure mode of the penetration type, the light first penetrates liquid crystal layer, then reflected by mirror surface of the pixels. "ON" action of a pixel means the reflected light penetrates the liquid crystal layer with a polarization state that pass analyzer and project on screen. "OFF" action of a pixel means the reflected light penetrate the liquid crystal layer but with a different polarization state that is blocked by analyzer. And further, in combination with the projection light source, the color splitting/combination mechanism and lens module, the original image can be enlarged and be projected onto a screen.

Referring to FIG. 6, light projection in a conventional micro-display, wherein a light source A is projected onto three polarizers A1, A2, and A3 so as to separate Red, Green and Blue colors which form the basic light source, and a dichroic C being used to combine three light sources is located at an appropriate position with the three polarizers A1, A2, and A3.

In addition, the red, green and blue light are respectively projected onto the micro-display devices B1, B2 and B3. They are the projection control devices for displaying images.

FIG. 7 shows the light combination process of a conventional micro-display based projection system wherein after the three monochromic lights have been projected onto the micro-display B1, B2 and B3, the mirror surfaces of the display B1, B2 and B2 are controlled to reflect images, and then reflections are guided to polarizers C1, C2 and C3 and the three red, green, and blue colors are combined at dichroic C. The images of red, green and blue after passing through the dichroic can be focused onto a screen forming a color image.

In FIG. 7, the light combination process of the conventional micro-display based projection system consists of three steps: assembly of optical components, adjusting of optical components and calibration on light path. Thus, the position of images on the micro-display and the positions of other optical components have to be adjusted such that the projection of red, green, blue can be superimposed correctly to form an image on the screen. However, positional errors often occur in the process of assembly. Due to fact that the number of pixels of the micro-display B1, B2 and B3 is designed based on the resolution of image projected, the number thereof is basically constant. For instance, the image resolution XGA is 1024×768 pixel, SXGA is 1280×1028 pixel, and UXGA is 1600×1200. In order to provide precise superimposition of images, the position of micro-displays B1, B2 and B2 must be adjusted or the optical lens module must be adjusted. The adjustment and calibration of the projected image on the display is rather laborious, in particular, the adjustment along the horizontal direction (X-axis) and vertical direction (Y-axis). The calibration cannot be easily achieved by an inexperienced operator and consequently slows down production speed.

SUMMARY OF THE INVENTION

Accordingly, it is an object of the present invention to provide a micro-display device wherein a plurality of additional pixels are added along the horizontal direction and vertical direction surrounding original pixels facilitating the positional adjustment of the projected images along the horizontal direction and vertical direction.

Yet another object of the present invention is to provide a micro-display device for the adjustment of images along the vertical direction and horizontal direction, wherein a simple software or electronic circuit signal can be used to control the adjustment such that the adjustment of image superimposition for the micro-display is time saving which is beneficial to the industries.

One aspect of the present invention is to provide a micro-display device comprising a control chip, a driving circuit and a plurality of metallic mirror pixels. The reflecting element, the driving circuit and the control chip are mounted in sequence from top to bottom and the driving circuit is controlled by display signals from control chip so as to drive the reflecting elements to control the "ON" and "OFF" of additional metallic mirror pixels along the horizontal (X-axis) and the vertical (Y-axis) direction such that the projected light from micro-displays R, G, and B during light combination can be accurately adjusted to a superimposed state.

Accordingly, the present invention provides a micro-display array, which comprises an array of pixel elements and a driving circuit. The array has a display region formed from a number of pixel elements less than the total number of pixel elements in the array. The extra pixel elements are used for positional adjustment of images in order to combine images from different sources. Each pixel element has an upper protective layer, a first electrode layer fixed to a lower surface of the upper protective layer, a liquid crystal layer sandwiched between the first electrode layer and a second electrode layer. The second electrode layer is mounted to a control chip. The driving circuit is communicated with the control chips of the pixel elements so that the driving circuit selectively controls reflectance of each of the pixel elements to form a desired image.

DETAILED DESCRIPTION OF THE PREFERRED EMBODIMENT

Figure 1:
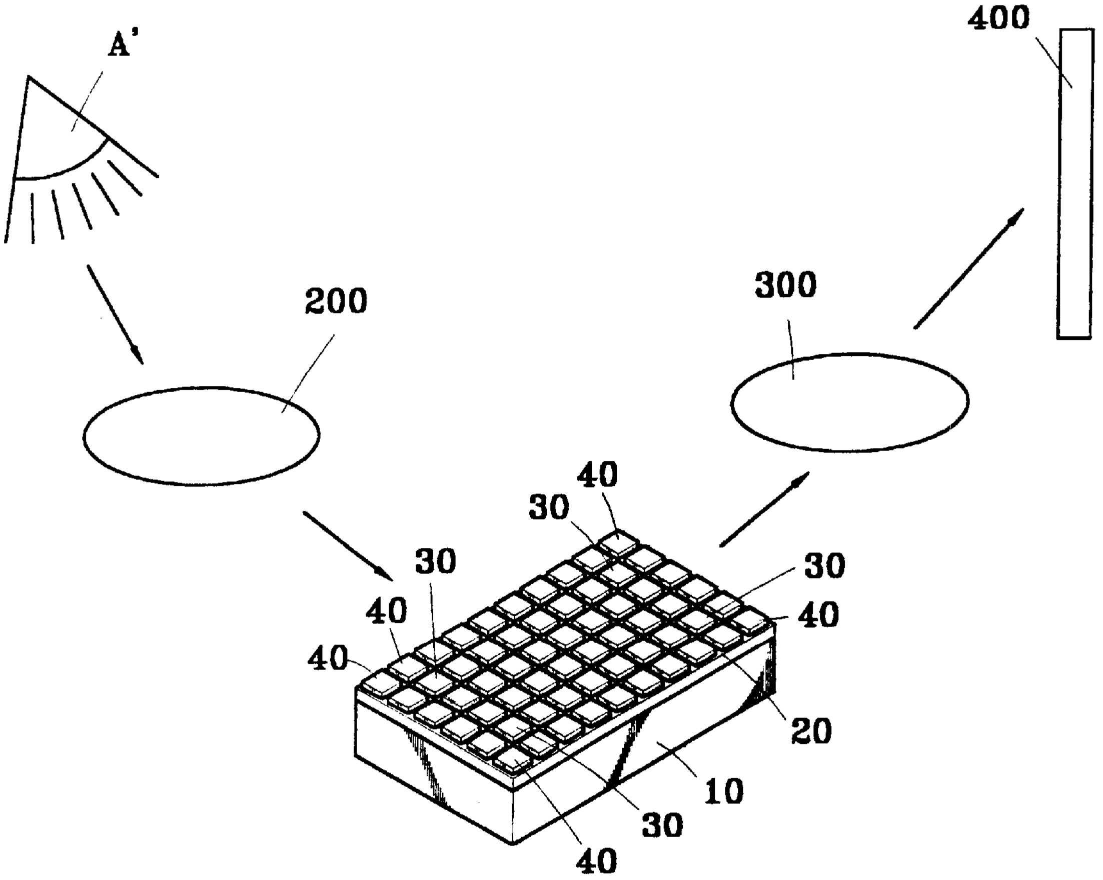
FIG. 1 is a perspective view of the micro-display element of the present invention, showing the state of projection of a monochromic image.
Figure 2:
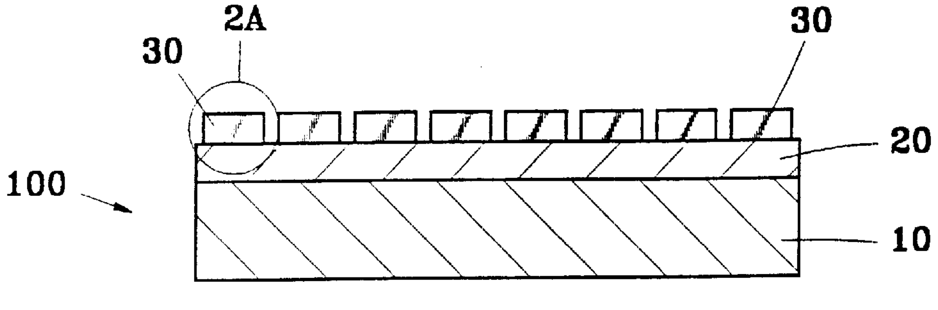
FIG. 2 is a sectional view of the micro-display element of the present invention.
Figure 3:
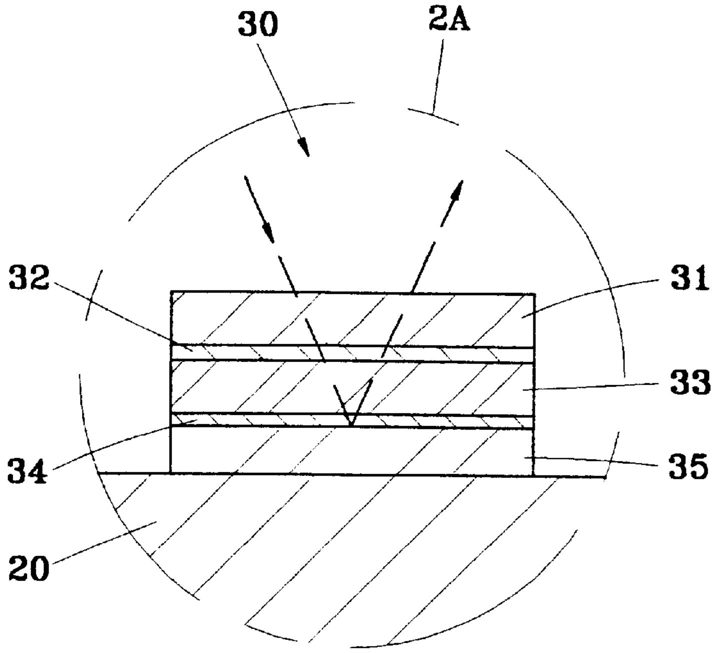
FIG. 3A is a sectional enlarged view of part 2A of FIG. 2 of the present invention.
FIG. 3B is another sectional enlarged view of part 2A of FIG. 2 of the present invention.
Figure 3:
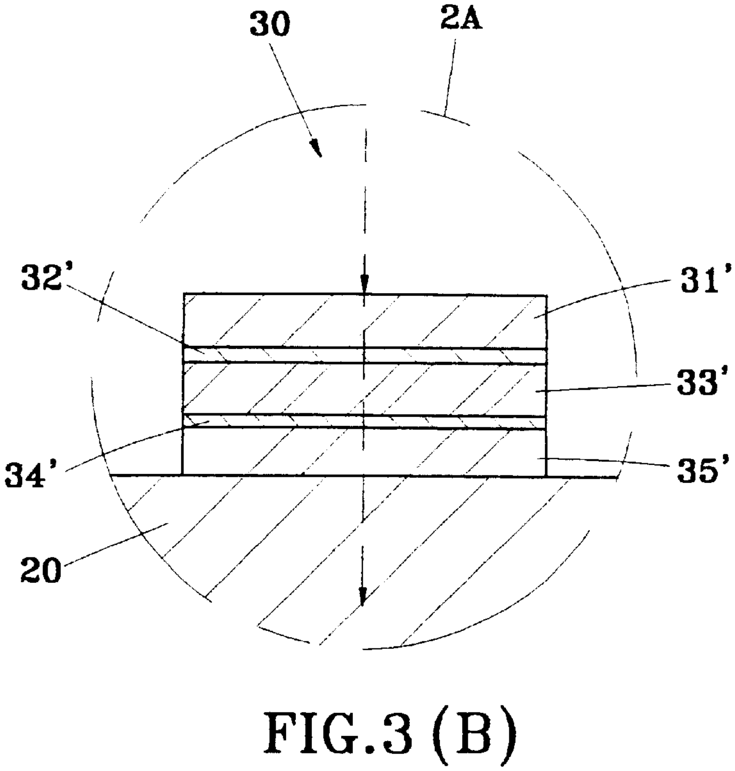

Referring to FIGS. 1–3, a micro-display device 100 is shown comprising a control chip 10, a driving circuit 20, a plurality of metallic mirror pixels 30, and a plurality of additional adjustment pixels 40. The control chip 10 is an integrated circuit component for controlling images and is connected to other electronic circuit devices (not shown) to obtain data for displaying images. The driving circuit 20 is connected to the upper section of the control chip 10 and is a circuit component used to drive LCD liquid crystal display. The driving circuit 20 is formed integrally with the control chip 10 as a unit. The upper section of the driving circuit 20 is provided with a plurality of metallic mirror pixels 30 and is controlled to turn "ON" or "OFF" by the driving circuit 20. The metallic mirror pixels 30 and the driving circuit 20 are integrally formed as a unit.

In accordance with the present invention, the metallic mirror pixels 30 of the micro-display 100 are shown as a reflection display type structure (shown in FIG. 3A). The structure shown in FIG. 3A is the sectional enlarged view of part 2A of FIG. 2. The layer structure from the top to the bottom is as follows: the mirror surface protective layer 31, an indium-tinoxide (ITO) electrode layer 32, a liquid crystal layer 33, a metallic electrode layer 34, and a chip 35 (as shown in FIG. 3), wherein the mirror surface protective layer 31 is a transparent glass, or other transparent material of equivalent property, and the chip 35 is connected to the driving circuit 20. When electrical voltage is supplied between the ITO electrode layer 32 and the metallic electrode layer 34, the liquid crystal layer 33 located in between the two will turn the reflection "ON" or "OFF". That is, by supplying voltage over the ITO electrode layer 32 and the metallic electrode layer 34, a monochromic light reflected from metallic mirror pixels 30 can be turned "ON" or "OFF". An image is constituted from the metallic mirror pixels 30 with "ON" or "OFF" status and projected on a screen. In other words, by means of the "ON" and "OFF" switching of the light reflection function of the metallic mirror pixel 30, the original image is formed and displayed.

Shown in FIG. 3B, there is another structure of the metallic mirror pixel 30, wherein the sectional enlarged view of FIG. 3B is corresponding to the part 2A of FIG. 2. The structure is arranged as follows: a mirror surface protective layer 31', an ITO electrode layer 32', a liquid crystal layer 33', an ITO electrode layer 34', and chip 35', wherein chip 35' is connected to the driving circuit 20 which are subjected to the driving control of the driving circuit 20. The ITO electrode layers 32' and 34' are supplied with electrical voltage to cause the liquid crystal layer 33' located in between the two to proceed with light penetration (ON) or light blockage (OFF) by changing polarization state of light. That is, by means of voltage over the ITO electrode layer 32' at the upper end and the ITO electrode layer 34' at the bottom layer, as light penetrate liquid crystal layer, each metallic mirror pixel 30 can turn "ON" or "OFF" the reflected light. In other words, by means of the "ON" and "OFF" switching on the light reflection function of the metallic mirror pixel 30 (i.e. each pixel), the original image is formed and is displayed.

At the surrounding of the metallic pixels 30 of the micro-display element 100, along the horizontal direction and the vertical direction, a plurality of additional pixels are mounted thereto. The structure is completely similar to that of the metallic mirror pixels 30 as shown in FIGS. 3A and 3B. In order to match the addressing of the digital signal from the driving circuit 20, for instance, to match with the addressing of a structure shown in FIG. 4, the number of elements is increased by a factor of four. The lower section of the adjustment pixel 40 is connected to the driving circuit 20 and is also subjected to the driving control of the driving circuit 20 to perform the "ON" or "OFF" function during image projection.

Referring to FIGS. 1–3, during image projection operation (as shown in FIG. 1), a light source A' is used to produce a monochromic light source via an optical module 200, and the monochromic light source is projected onto the metallic mirror pixel 30 at the top portion of the micro-display element 100 and the adjustment pixel 40, and by means of the "ON" and "OFF" function control of the reflection projection of the metallic mirror pixel 30 and the adjustment pixel 40, the reflection image can be projected onto a screen 400 via the optical module 300, and performs into a monochromic projected image.

Figure 4:
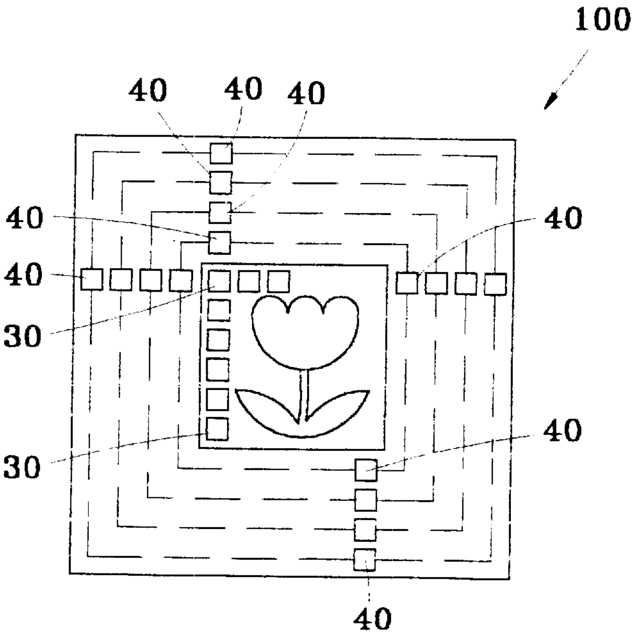
FIG. 4 is a top view, showing the status of the metallic mirror pixels when the micro-display device projects the original image.

Referring to FIG. 4, each of the metallic mirror pixel 30 and the adjustment pixels 40 at the surrounding thereof form the original images by means of the projection "ON"/"OFF" function. The chip 10 and the driving circuit 20 are used to drive each of the metallic pixels 30 to form the original images. As the image is formed in the area of the metallic pixel 30, the standard position of the pixels 30 are employed for displaying one monochromic image. When the projected images of Red, Green and Blue are combined, and if the positions from Red, Green and Blue images are displaced in horizontal direction (X-axis) or vertical direction (Y-axis), the driving control of the control chip 10 and the driving circuit 20 are employed to cause the image, which is originally displayed in the area of the metallic mirror pixels 30, to shift along the horizontal or vertical direction, such that a portion of the original image is controlled under the adjustment pixel 40. This image shift can be obtained via the control software to drive the control chip 10 and the driving circuit 20.

Figure 5:
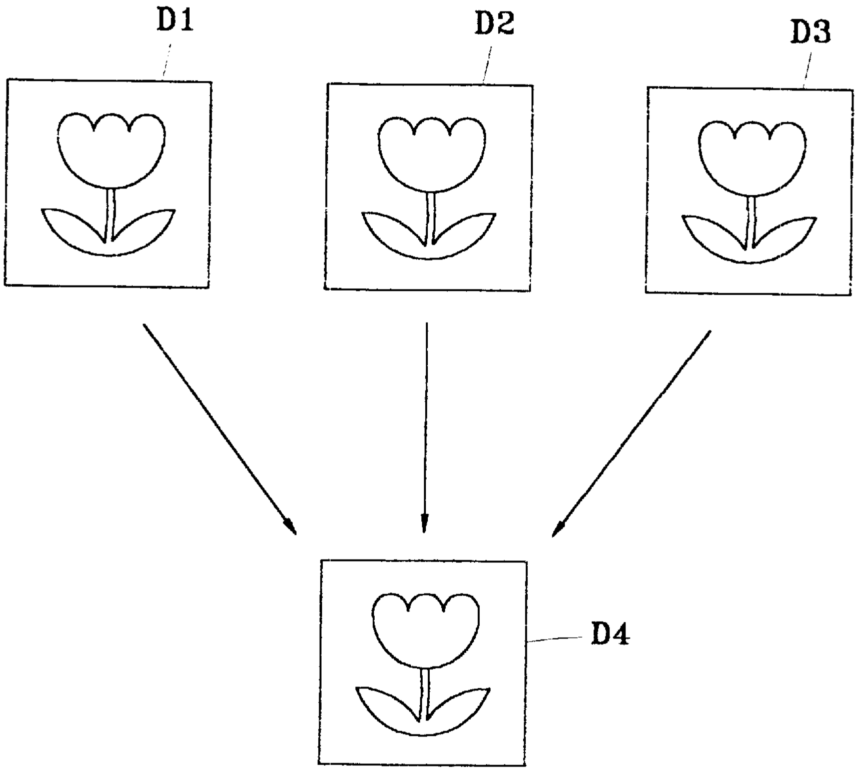
FIG. 5 is a schematic view showing the combination of the projected images of R, G, B micro-display devices in accordance with the present invention.
Figure 6:
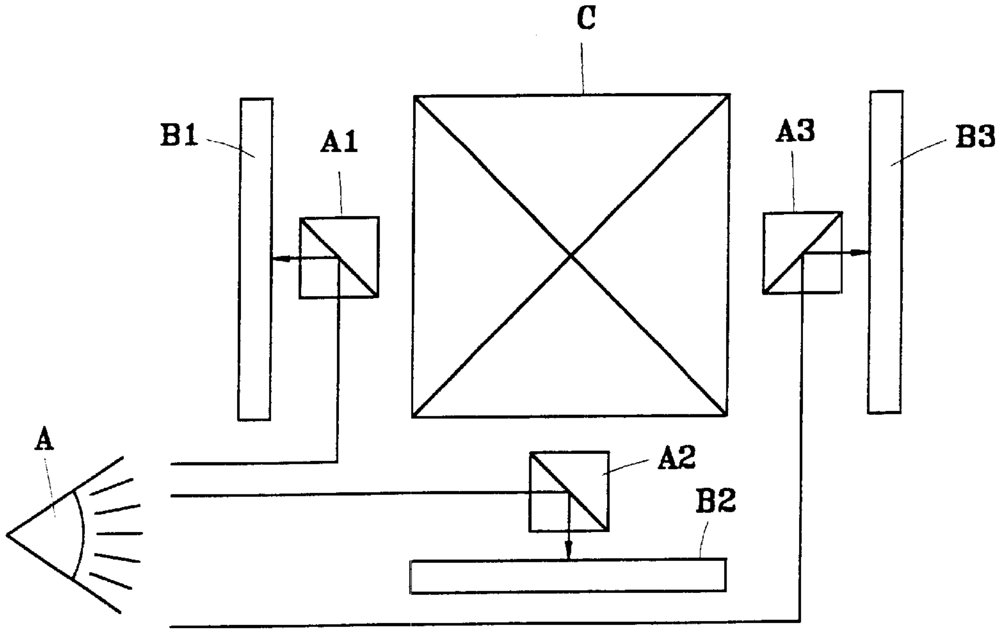
FIG.6 PRIOR ART
FIG. 6 is a simplified schematic view of light splitting process of a conventional micro-display based projection system.
Figure 7:
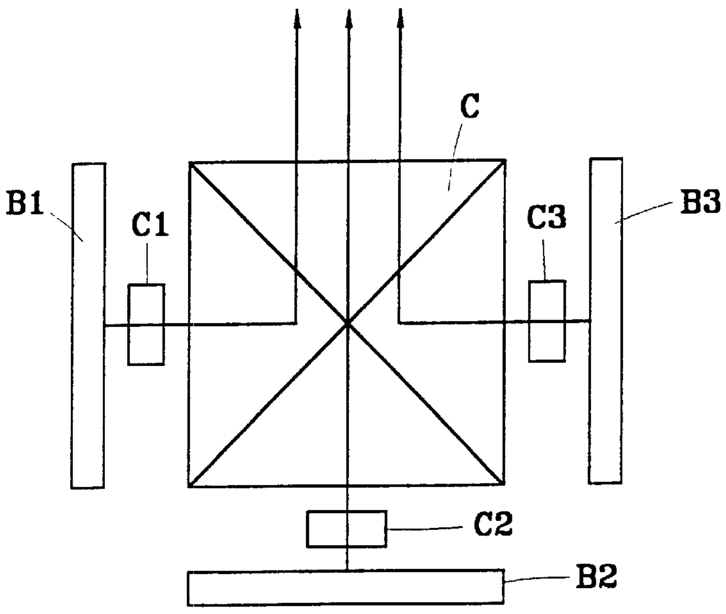
FIG.7 PRIOR ART
FIG. 7 is a simplified schematic view of light combination process of a conventional micro-display based projection system.

As shown in FIG. 5, the original images of Red(R), Green (G) and Blue (B) are proceeded to light combination and image superimposition. For simplication, D1, D2, D3 are respectively used to denote the first, second, and third projected images, and D4 denotes the combined image. In practice, the three micro-displays 100, representing red, green and blue are secured on an optical engine (not shown), and D2 is then used as the reference position of the superimposed image. That is, the original image of micro-display 100 (representing green image) is locked. This is because the green light is the main light and is most visible to human eyes. Then D2 is adjusted to have the focal length and the brightness at an appropriate condition, and the projection position is located at the center position of the screen 400 of FIG. 1.

After D2 has been secured, adjusting the first projected image D1, and the third projected image D3 in sequence to superimpose onto the second projected image D2. At this instance, due to the differences of the properties of optical module 300 used by the micro-display 100 and the optical parameters, there is a slight position bias for the position of the projected superimposition in the process of superimposition of D1, D2 and D3. The difference is within a few pixels. When the projected image is to be horizontally or vertically shifted, for instance, the first projected image D1 and the third projected image D3, the micro-display element 100 representing the red or blue light can provide a shift function and range of shifting for the horizontal or vertical direction shift of image by means of the adjustment pixels 40, such that D1 and D3 can precisely superimpose with D2 so as to obtain the combined image D4. In the process of image shifting adjustment, this can be achieved by software adjusting. Thus, there is no need for an experienced technician to accomplish precise combination of images from Red, Green and Blue micro-display 100. Also adjusting time is drastically reduced.

Conclusively, the present invention provides a micro-display array, which comprises an array of pixel elements and a driving circuit. The array has a display region formed from a number of pixel elements less than the total number of pixel elements in the array. Each pixel element has an upper protective layer, a first electrode layer fixed to a lower surface of the upper protective layer, a liquid crystal layer sandwiched between the first electrode layer and a second electrode layer. The second electrode layer is mounted to a control chip. The driving circuit is communicated with the control chips of the pixel elements so that the driving circuit selectively controls reflectance of each of the pixel elements to form a desired image. Additionally, extra mirror pixels are created at the surrounding of original pixels used for displaying images. These extra mirror pixels are used for adjusting horizontal/vertical position of images from other micro-display devices in order to have one precise combined image.

While the invention has been describe with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

What is claimed is:

1. A micro-display array comprising:

an array of pixel elements, said array having a display region formed from a number of pixel elements less than the total number of pixel elements in said array, each said pixel element having an upper protective layer, a first electrode layer being fixed to a lower surface of said upper protective layer, a liquid crystal layer being sandwiched between said first electrode layer and a second electrode layer, said second electrode layer being mounted to a control chip; and, a driving circuit in electrical communication with each of said control chips of said pixel elements, whereby said driving circuit selectively controls reflectance of each of said pixel elements to form a desired image.

2. The micro-display array as recited in claim 1 wherein said first electrode layer is formed of indium-tin-oxide.

3. The micro-display array as recited in claim 1 wherein said second electrode layer is formed of indium-tin-oxide.

4. The micro-display array as recited in claim 1 wherein a remainder of pixel elements outside of said display region are selectively controlled by said driving circuit to allow said desired image to shift along horizontal and vertical axes of said array.

* * * * *